US012644189B2

(12) United States Patent
Yao et al.

(10) Patent No.: US 12,644,189 B2
(45) Date of Patent: Jun. 2, 2026

(54) ANTI-CAVITATION DAMPING COMPOSITE METAL STRUCTURE FOR FLOW PASSAGE COMPONENT

(71) Applicant: HOHAI UNIVERSITY, Nanjing (CN)

(72) Inventors: Hongbing Yao, Nanjing (CN); Yuanhang Zhou, Nanjing (CN); Wenlong Li, Nanjing (CN); Wenjie Shi, Nanjing (CN); Wei Su, Nanjing (CN); Jiang Yue, Nanjing (CN); Xiang He, Nanjing (CN); Yuanyuan Xiang, Nanjing (CN); Weihua Zhu, Nanjing (CN)

(73) Assignee: HOHAI UNIVERSITY, Nanjing (CN)

( * ) Notice: Subject to any disclaimer, the term of this patent is extended or adjusted under 35 U.S.C. 154(b) by 93 days.

(21) Appl. No.: 18/386,662

(22) Filed: Nov. 3, 2023

(65) Prior Publication Data

US 2024/0150900 A1     May 9, 2024

(30) Foreign Application Priority Data

Nov. 3, 2022    (CN) .......................... 202211367947.7

(51) Int. Cl.
C23C 24/10          (2006.01)
B23K 26/356        (2014.01)
(Continued)

(52) U.S. Cl.
CPC .......... C23C 24/103 (2013.01); B23K 26/356 (2015.10); B23K 26/362 (2013.01);
(Continued)

(58) Field of Classification Search
CPC ... C23C 28/021; C23C 28/023; C23C 28/027; C23C 28/04; C23C 28/028;
(Continued)

(56) References Cited

U.S. PATENT DOCUMENTS

2003/0118874 A1*   6/2003   Murphy .............. C23C 28/3455
                                                                        427/596
2016/0369637 A1*  12/2016   Subramanian .......... F01D 5/288

OTHER PUBLICATIONS

Machine Translation, Du Chunyan, Research on Corrosion Resistance of the Nickel-aluminum Bronze and the Surface Treatment on It, A Thesis Submitted in Fulfillment of the Requirements for the Degree of Master of Engineering, Jiangsu Univ. of Sci. and Tech, 2014 (no month), Chapter 5. (Year: 2014).*

(Continued)

*Primary Examiner* — Michael E. La Villa
(74) *Attorney, Agent, or Firm* — Bayramoglu Law Offices, LLC

(57)                              ABSTRACT

An anti-cavitation damping composite metal structure for a flow passage component and a preparation method thereof are provided. The preparation method includes: cladding a gradient functional material layer by layer on a substrate of a flow passage component; forming periodic structures on a surface of each layer of the gradient functional material through etching by an ultrafast laser to absorb a part of an impact load energy caused by cavitation of the flow passage component, where the layers of the gradient functional material form a gradient coating with a toughness increasing layer by layer and a hardness decreasing layer by layer from bottom to top; and forming nano twins on a surface layer by a laser shock peening technique, and implanting a residual compressive stress to further improve anti-cavitation resistance of a surface.

7 Claims, 1 Drawing Sheet

(51) Int. Cl.

| | |
|---|---|
| B23K 26/362 | (2014.01) |
| B32B 3/00 | (2006.01) |
| B32B 3/02 | (2006.01) |
| B32B 3/06 | (2006.01) |
| B32B 3/10 | (2006.01) |
| B32B 3/12 | (2006.01) |
| B32B 3/26 | (2006.01) |
| B32B 3/30 | (2006.01) |
| B32B 15/00 | (2006.01) |
| B32B 15/01 | (2006.01) |
| B32B 15/04 | (2006.01) |
| B32B 15/20 | (2006.01) |
| C22C 19/00 | (2006.01) |
| C22C 19/03 | (2006.01) |
| C22C 30/00 | (2006.01) |
| C22C 32/00 | (2006.01) |
| C22C 38/02 | (2006.01) |
| C22C 38/04 | (2006.01) |
| C22C 38/44 | (2006.01) |
| C22F 3/00 | (2006.01) |
| C23C 4/00 | (2016.01) |
| C23C 4/01 | (2016.01) |
| C23C 4/02 | (2006.01) |
| C23C 4/06 | (2016.01) |
| C23C 4/067 | (2016.01) |
| C23C 4/08 | (2016.01) |
| C23C 4/10 | (2016.01) |
| C23C 4/11 | (2016.01) |
| C23C 4/18 | (2006.01) |
| C23C 28/00 | (2006.01) |
| C23C 28/02 | (2006.01) |
| C23C 28/04 | (2006.01) |
| C23C 30/00 | (2006.01) |
| C23F 4/00 | (2006.01) |
| C23F 17/00 | (2006.01) |

(52) U.S. Cl.
CPC ................ *B32B 3/00* (2013.01); *B32B 3/02* (2013.01); *B32B 3/06* (2013.01); *B32B 3/10* (2013.01); *B32B 3/12* (2013.01); *B32B 3/263* (2013.01); *B32B 3/266* (2013.01); *B32B 3/30* (2013.01); *B32B 15/01* (2013.01); *B32B 15/017* (2013.01); *B32B 15/04* (2013.01); *B32B 15/043* (2013.01); *B32B 15/20* (2013.01); *C22C 19/002* (2013.01); *C22C 19/03* (2013.01); *C22C 30/00* (2013.01); *C22C 32/0063* (2013.01); *C22C 38/02* (2013.01); *C22C 38/04* (2013.01); *C22C 38/44* (2013.01); *C22F 3/00* (2013.01); *C23C 4/00* (2013.01); *C23C 4/01* (2016.01); *C23C 4/02* (2013.01); *C23C 4/06* (2013.01); *C23C 4/067* (2016.01); *C23C 4/08* (2013.01); *C23C 4/10* (2013.01); *C23C 4/11* (2016.01); *C23C 4/18* (2013.01); *C23C 24/106* (2013.01); *C23C 28/021* (2013.01); *C23C 28/023* (2013.01); *C23C 28/027* (2013.01); *C23C 28/028* (2013.01); *C23C 28/04* (2013.01); *C23C 28/048* (2013.01); *C23C 28/30* (2013.01); *C23C 28/32* (2013.01); *C23C 28/321* (2013.01); *C23C 28/322* (2013.01); *C23C 28/324* (2013.01); *C23C 28/325* (2013.01); *C23C 28/36* (2013.01); *C23C 28/44* (2013.01); *C23C 30/00* (2013.01); *C23C 30/005* (2013.01); *C23F 4/00* (2013.01); *C23F 17/00* (2013.01); *Y02P 10/25* (2015.11); *Y10T 428/12451* (2015.01); *Y10T 428/12458* (2015.01); *Y10T 428/12472* (2015.01); *Y10T 428/12771* (2015.01); *Y10T 428/12778* (2015.01); *Y10T 428/12903* (2015.01); *Y10T 428/1291* (2015.01); *Y10T 428/12917* (2015.01); *Y10T 428/12931* (2015.01); *Y10T 428/12937* (2015.01); *Y10T 428/12944* (2015.01); *Y10T 428/12951* (2015.01); *Y10T 428/12958* (2015.01)

(58) Field of Classification Search
CPC ....... C23C 28/048; C23C 28/30; C23C 28/32; C23C 28/321; C23C 28/322; C23C 28/324; C23C 28/325; C23C 28/36; C23C 28/44; C23C 24/103; C23C 24/106; C23C 30/00; C23C 30/005; C23C 4/00; C23C 4/18; C23C 4/06; C23C 4/067; C23C 4/10; C23C 4/11; C23C 4/08; C23C 4/01; C23C 4/02; B23K 26/356; B23K 26/362; C22C 19/002; C22C 19/03; C22C 30/00; C22C 32/0063; C22C 38/02; C22C 38/04; C22C 38/44; C22F 3/00; C22F 4/00; C22F 17/00; Y02P 10/25; B32B 3/00; B32B 3/02; B32B 3/06; B32B 3/10; B32B 3/12; B32B 3/263; B32B 3/266; B32B 3/30; B32B 15/01; B32B 15/017; B32B 15/04; B32B 15/043; B32B 15/20; Y10T 428/12458; Y10T 428/12451; Y10T 428/12472; Y10T 428/12903; Y10T 428/12771; Y10T 428/12778; Y10T 428/1291; Y10T 428/12917; Y10T 428/12931; Y10T 428/12937; Y10T 428/12944; Y10T 428/12951; Y10T 428/12958

See application file for complete search history.

(56) References Cited

OTHER PUBLICATIONS

V. Saez, et al., Chacterization of a 20 KHz sonoreactor. Part I: analysis of mechanical effects by classical and numerical methods, Ultrasonics Sonochemistry, 2005, pp. 59-65, vol. 12.

Du Chunyan, Research on Corrosion Resistance of the Nickel-aluminum Bronze and the Surface Treatment on It, A Thesis Submitted in Fulfillment of the Requirements for the Degree of Master of Engineering, Jiangsu University of Science and Technology, 2014, pp. 1-81.

* cited by examiner

ANTI-CAVITATION DAMPING COMPOSITE METAL STRUCTURE FOR FLOW PASSAGE COMPONENT

CROSS REFERENCE TO THE RELATED APPLICATIONS

This application is based upon and claims priority to Chinese Patent Application No. 202211367947.7, filed on Nov. 3, 2022, the entire contents of which are incorporated herein by reference.

TECHNICAL FIELD

The present disclosure relates to a novel gradient damping composite coating technique for a flow passage component, and in particular to an anti-cavitation damping composite metal structure for a flow passage component and a preparation method thereof.

BACKGROUND

Flow passage components are prone to cavitation erosion. After a liquid is vaporized, bubbles are generated and collapse in a very short time (μs). During the collapse process, a local high-pressure and high-speed (about 200 m/s) water jet and an extremely high impact pressure (GPa) are generated and act on the surface of the flow passage component for many times (100-1,000 times/(s·cm$^2$)) in a very short time (a few microseconds). In this extreme working condition, the material surface often experiences pitting, plastic deformation, strain hardening, and fatigue crack propagation, which seriously affect the life and reliability of the flow passage component and increase the noise level of the flow passage component. According to research, the current anti-cavitation lifespan of large propellers in China is only 120 hours, which seriously affects the service life and reliability of surface and underwater equipment. Cavitation erosion involves complex physical and chemical processes with microscopic, downstream, random, and multiphase characteristics. Domestic and foreign scholars have conducted extensive and in-depth research on cavitation.

At present, there are mainly three methods to improve the anti-cavitation performance of metals in fluids [Sáez V, Frías-Ferrer A, Iniesta J, et al. *Characterization of A 20 kHz Sonoreactor. Part I: Analysis of Mechanical Effects by Classical and Numerical Methods* [J]. Ultrasonics Sonochemistry, 2005, 12(1-2): 59-65]. First, the design is improved to reduce the kinematic pressure difference on the metal surface, that is, to reduce the intensity of cavitation. Second, the environmental conditions, such as fluid temperature and corrosiveness, under which the metal acts are changed. Third, a material with desired anti-cavitation performance is chosen or a protective layer with desired anti-cavitation performance is prepared on the material surface to improve the anti-cavitation performance of the material surface while ensuring the overall mechanical properties of the metal material, thereby reducing the damage of cavitation to the surface of the component. However, specific structural design and operating environment conditions are clearly hard to change. Therefore, improving the microstructure of the material through a surface modification technique (SMT) without changing the structural design is expected to become an effective way to regulate the surface mechanical properties of the flow passage component so as to improve the anti-cavitation performance thereof. SMT is a strengthening technique that improves the mechanical properties of mechanical parts or materials, mainly including chemical heat treatment, surface coating, and deformation strengthening, etc. The existing surface strengthening techniques for propellers, for example, heat treatment, nitriding treatment, and coating treatment, have drawbacks like shallow strengthening layer, uncontrollable microstructure/stress, coarse grain size, and susceptibility to fatigue induced cavitation damage. As a new type of surface deformation strengthening technique, laser shock peening (LSP) is one of the most effective methods to prolong the life of components by changing the microstructure of the metal surface and inducing a high-amplitude residual compressive stress on the surface to suppress the initiation and propagation of fatigue cracks.

The existing surface treatment techniques for propellers mainly include chemical heat treatment, coating strengthening, and deformation strengthening, etc. Chemical heat treatment is a heat treatment process that maintains the material at a preset temperature for a period of time to allow active atoms in the medium to penetrate into the surface of the workpiece, so as to form a new compound to improve the surface properties of the material. It can improve the wear resistance, hardness, fatigue resistance, and corrosion resistance of the surface of the workpiece. However, due to the limited penetration of the active atoms, the strengthening layer is only at a micrometer level. Therefore, the initiation and propagation periods of cavitation are short under extreme working conditions.

The coating technique involves copper alloy coatings, cobalt-based metal coatings, ceramic coatings, nickel coatings, and stainless steel coatings, etc. These coatings are mainly applied by thermal spraying, and some of them have a certain effect on suppressing cavitation. Jinyun Xue and Du Chunyan sprayed a 316L stainless steel coating onto a nickel aluminum bronze alloy by an arc spraying method for surface treatment [Du Chunyan. *Research on Corrosion Resistance and Surface Treatment of Nickel Aluminum Bronze Alloy* [D]. Jiangsu University of Science and Technology, 2014.]. They measured the mechanical properties and corrosion mechanism of the coating and found that the seawater corrosion resistance and cavitation resistance of the coating sample were lower than those of a cast nickel aluminum bronze alloy. If a ceramic coating with higher hardness is used, due to its inherent brittleness, it will be easy to fall off during the initiation period of cavitation, thereby significantly shortening its lifespan. At present, research on anti-cavitation coatings of flow passage components mainly focuses on single coatings, and there have been no reports on gradient damping composite coatings of flow passage components.

SUMMARY

To overcome the aforementioned shortcomings existing in the prior art, an objective of the present disclosure is to propose a novel gradient damping composite coating technique for a flow passage component. In the present disclosure, a gradient functional material is cladded layer by layer on a substrate layer of a flow passage component. Periodic structures are formed on a surface of each layer of the gradient functional material through etching by an ultrafast laser to absorb a part of an impact load energy caused by cavitation of the flow passage component. Each layer of the gradient functional material together forms a gradient coating with a toughness increasing layer by layer and a hardness decreasing layer by layer from bottom to top. In addition, nano twins are formed on a surface of a top layer by a laser shock peening technique, and a residual compressive stress is implanted to further improve anti-cavitation resistance of a surface. This method can form a millimeter-level strengthening layer and a high-damping-coefficient composite coating that is hard outside and tough inside, effectively dissipating a kinetic energy of an impact load generated by a water jet while ensuring corrosion resistance and peeling resistance. The coating includes a tough inner layer and a hard and wear-resistant outer layer. The mechanical properties of the material experience a gradient change to effectively regulate the residual stress. Meanwhile, the coating and substrate layer have a high interfacial bonding strength.

The present disclosure adopts the following technical solutions. A gradient damping composite coating is formed at a susceptible part of a flow passage component, where the gradient damping composite coating includes a high-manganese aluminum bronze substrate layer; a nickel copper layer, a hard alloy layer, and a ceramic alloy layer are sequentially formed by laser cladding from the substrate layer to a surface layer; and periodic structures are preformed between each two adjacent layers by an ultrafast laser to dissipate a vibration energy of a specific wavelength.

In a preparation method of the gradient damping composite coating, the nickel copper layer, the hard alloy layer, and the ceramic alloy layer in the gradient damping composite coating are prepared by laser cladding, and the periodic structures are prepared by the ultrafast laser.

The preparation method of the gradient damping composite coating for the flow passage component includes the following steps:

(1) polishing the high-manganese aluminum bronze substrate layer, and forming the periodic structures on the substrate layer through etching by a picosecond green laser, where a spacing between the periodic structures is an integer multiple of a wavelength of a stress wave applied onto a surface of the flow passage component;

(2) cladding the nickel copper layer by a semiconductor laser on a surface of the substrate layer, polishing the nickel copper layer, and forming the periodic structures on the nickel copper layer through etching by a picosecond green laser, where a spacing between the periodic structures is an integer multiple of the wavelength of the stress wave applied onto the surface of the flow passage component;

(3) cladding the hard alloy layer on a surface of the nickel copper layer by a semiconductor laser, polishing the hard alloy layer, and forming the periodic structures on a surface of the hard alloy layer through etching by a picosecond green laser, where a spacing between the periodic structures is an integer multiple of the wavelength of the stress wave applied onto the surface of the flow passage component;

(4) cladding the ceramic alloy layer on a surface of the hard alloy layer by a semiconductor laser through coaxial powder feeding to form the gradient damping composite coating; and (5) strengthening the ceramic alloy layer by a laser shock peening technique, refining grains in the ceramic alloy layer to form nano twins on a surface, and implanting a residual compressive stress layer.

The present disclosure further proposes an anti-cavitation damping composite metal structure for a flow passage component, formed by the above preparation method.

The present disclosure has following beneficial effects:

1. In the present disclosure, the substrate layer of the flow passage component is made of the high-manganese aluminum bronze alloy, and the surface coating of the flow passage component sequentially includes the nickel copper layer, the hard alloy layer, and the ceramic alloy layer. Three layers of periodic structures are formed to dissipate the stress wave and achieve layer-by-layer dissipation of cavitation energy, thereby leading to a gradient change in the internal mechanical properties of the material.

2. A tough material is cladded at the core, and a super-hard material is cladded at the surface layer. The hardness of the cladding layer decreases sequentially from the outside to the inside, thereby maintaining a certain degree of toughness while improving the surface hardness, and forming the gradient material structure hard outside and tough inside to reduce the brittle and hard peeling of the surface of the flow passage component during cavitation.

3. The grains of ceramic alloy layer are refined by laser shock peening to form the nano twins, and the surface residual stress is regulated to refine the α-phase grains on the surface, further improving toughness, strengthening the surface of the flow passage component, and reducing cavitation damage. In addition, the periodic structures are formed between each layer. Due to the complexity of the damping mechanism of the gradient coating, each layer achieves corresponding energy dissipation of the impact wave, so the impact wave of some wavelength is to some extent resonantly dissipated by the gradient damping composite coating.

DETAILED DESCRIPTION OF THE EMBODIMENTS

The present disclosure will be further described below with reference to the drawings.

Figure 1:
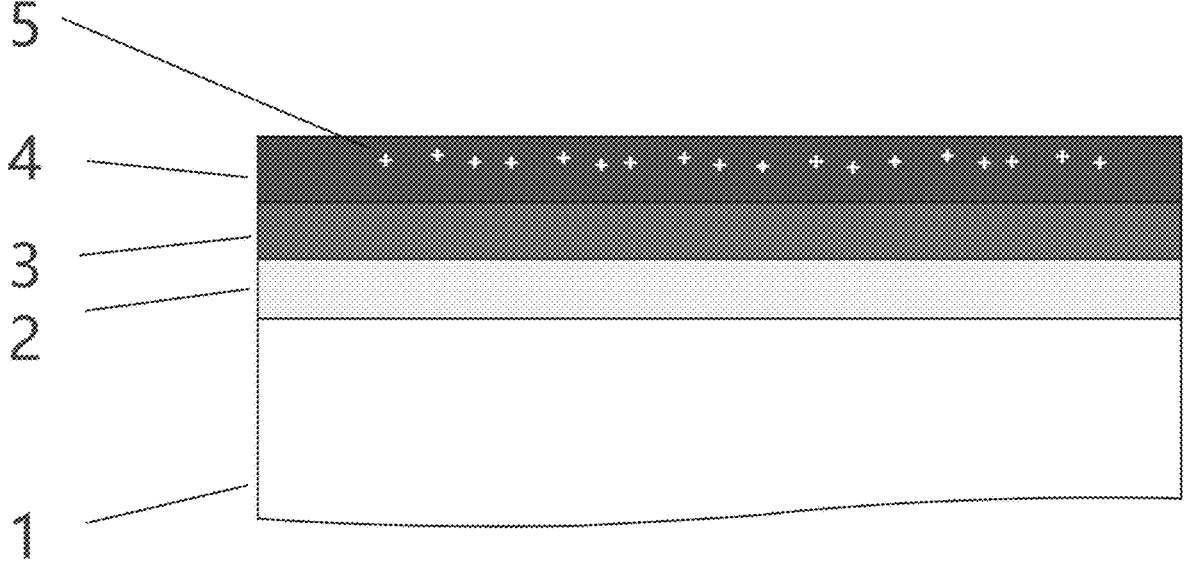
FIG. 1 is a schematic diagram of a gradient damping composite coating according to the present disclosure, where 1 denotes a substrate layer of a flow passage component, 2 denotes a nickel copper layer with a thickness of 3 mm, 3 denotes a hard alloy layer with a thickness of 3 mm, 4 denotes a ceramic alloy layer with a thickness of 3 mm, and 5 denotes nano twins.
Figure 2:
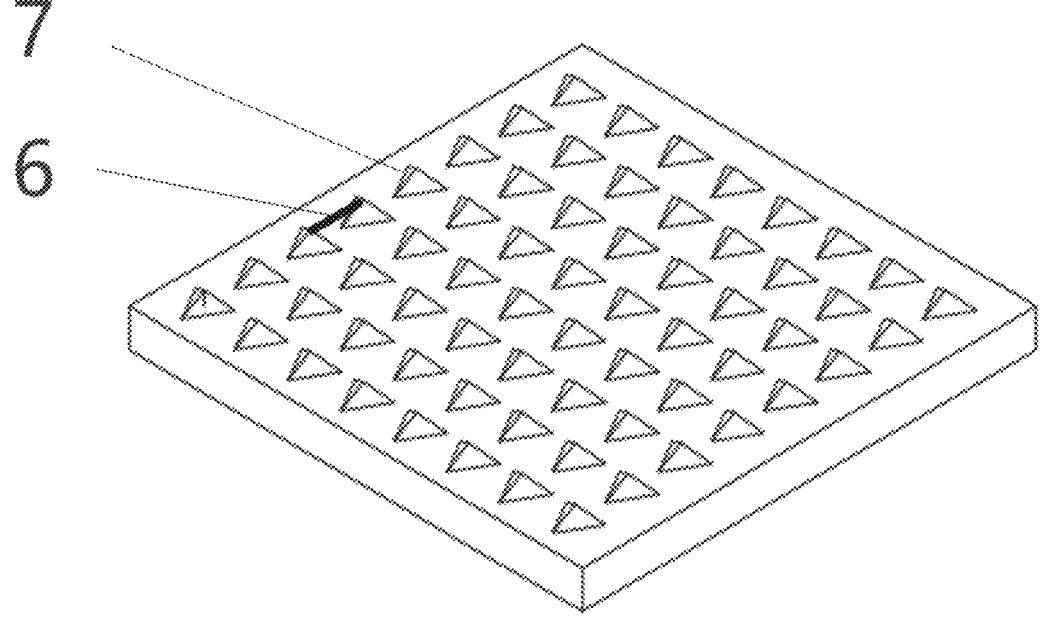
FIG. 2 is a schematic diagram of periodic pyramid structures formed between each layer according to the present disclosure, where 7 denotes a regular tetrahedron with a side length of 2.7 mm, and 6 denotes a spacing of 2.7 mm between regular tetrahedrons.

The present disclosure provides an anti-cavitation damping composite metal structure for a flow passage component. As shown in FIGS. 1 and 2, a substrate layer 1 of the flow passage component is a high-manganese aluminum bronze layer. A nickel copper layer 2, a hard alloy layer 3, and a ceramic alloy layer 4 are sequentially formed by laser cladding from the substrate layer to a surface layer. Periodic structures are preformed between the nickel copper layer, the hard alloy layer, and the ceramic alloy layer through etching an ultrafast laser to dissipate vibration energy of a specific wavelength.

In a preparation method of the gradient damping composite metal structure, the nickel copper layer, the hard alloy layer, and the ceramic alloy layer in the gradient damping composite metal structure are prepared by laser cladding, and the periodic structures are prepared by an ultrafast laser.

The preparation method of the gradient damping composite metal structure for the flow passage component includes the following steps.

(1) The high-manganese aluminum bronze substrate layer is polished with 200-2,000 grit sandpaper. Periodic structures are formed on the substrate layer through etching by a picosecond green laser with a power of 30 W in a three-dimensional (3D) galvanometer scanning mode at a scanning speed of 100 mm/s. The periodic structures are pyramid structures (as shown in FIG. 2). The periodic structures are regular tetrahedrons 7 with a side length of 2.7 mm and a spacing 6 of 2.7 mm. The spacing (2.7 mm) is an integer multiple of a wavelength of a stress wave applied onto the surface of the flow passage component.

(2) The nickel copper layer is cladded on the surface of the substrate layer by a semiconductor laser with a power of 700 W and a scanning speed of 8 mm/s through coaxial powder feeding at a rate of 8.5 g/min. A circular spot is used, with a diameter of 2 mm and a defocusing amount of 11 mm. Ar is used as a protective gas. The nickel copper layer is prepared from a mixed powder including approximately 60% Ni, 33% Cu, and 7% Fe. The nickel copper layer is polished. Periodic structures are formed on the nickel copper layer through etching by a picosecond green laser with a power of 30 W in a 3D galvanometer scanning mode at a scanning speed of 100 mm/s. The periodic structures are pyramid structures (as shown in FIG. 2). The periodic structures are regular tetrahedrons 7 with a side length of 2.7 mm and a spacing 6 of 2.7 mm. The spacing (2.7 mm) is an integer multiple of a wavelength of a stress wave applied onto the surface of the flow passage component.

(3) The hard alloy layer is cladded on the surface of the nickel copper layer by a semiconductor laser with a power of 1,500 W and a scanning speed of 15 mm/s through coaxial powder feeding at a rate of 17 g/min. A circular spot is used, with a diameter of 2 mm and a defocusing amount of 11 mm. Ar is used as a protective gas. The hard alloy layer is prepared from a mixed powder including approximately 0.03% C, 0.7% Si, 1.25% Mn, 17.6% Cr, 19.5% Ni, 2.25% Mo, and 58.67% Fe. The hard alloy layer is polished. Periodic structures are formed on the hard alloy layer through etching by a picosecond green laser with a power of 30 W in a 3D galvanometer scanning mode at a scanning speed of 100 mm/s. The periodic structures are pyramid structures (as shown in FIG. 2). The periodic structures are regular tetrahedrons 7 with a side length of 2.7 mm and a spacing 6 of 2.7 mm. The spacing (2.7 mm) is an integer multiple of a wavelength of a stress wave applied onto the surface of the flow passage component.

(4) The ceramic alloy layer is cladded on the surface of the hard alloy layer by a semiconductor laser with a power of 2,500 and a scanning speed of 200 mm/s through coaxial powder feeding at a rate of 10 g/min. A circular spot is used, with a diameter of 2 mm and a defocusing amount of 11 mm. Ar is used as a protective gas. The ceramic alloy layer is prepared from a mixed powder including approximately 42% Ni, 42% Fe, 3% B, 3% Si, and 10% SiC. Finally, the surface ceramic alloy layer is formed.

(5) The ceramic alloy layer is strengthened by a laser shock peening technique to form nano twins 5. A black tape is used as an absorption layer, and water is used as a restraint layer with a thickness of 2 mm. A circular Gaussian spot with a diameter of 3 mm is used, with a spot overlapping ratio of 50%, a single pulse energy of 5-10 J, and a pulse width of 10 ns.

The series of detailed descriptions listed above are only specific illustration of feasible implementations of the present disclosure, rather than limiting the claimed scope of the present disclosure. All equivalent manners or changes made without departing from the technical spirit of the present disclosure should be included in the claimed scope of the present disclosure.

What is claimed is:

1. An anti-cavitation damping composite metal structure for a flow passage component, formed by cladding, layer by layer, a gradient material on a substrate of the flow passage component; and forming a plurality of periodic structures on a surface of each layer of the gradient material through etching by an ultrafast laser to absorb a part of an impact load energy caused by a cavitation of the flow passage component, wherein the each layer of the gradient material together forms a gradient coating with a toughness increasing layer by layer and a hardness decreasing layer by layer from outside to inside; wherein the preparation method comprises the following steps:

step S1: polishing a substrate made of high-manganese aluminum bronze, and forming first periodic structures of the plurality of periodic structures on the substrate made of the high-manganese aluminum bronze through the etching by a picosecond green laser, wherein a spacing between the first periodic structures is an integer multiple of a wavelength of a stress wave applied onto the corresponding surface of the flow passage component;

step S2: laser cladding a nickel copper layer by coaxial powder feeding using a semiconductor laser on a surface of the substrate made of the high-manganese aluminum bronze, polishing the nickel copper layer, and forming second periodic structures of the plurality of periodic structures on the nickel copper layer through the etching by the picosecond green laser, wherein a spacing between the second periodic structures is an integer multiple of a wavelength of a stress wave applied onto the corresponding surface of the flow passage component;

step S3: laser cladding a hard alloy layer on a surface of the nickel copper layer by coaxial powder feeding using the semiconductor laser, polishing the hard alloy layer, and forming third periodic structures of the plurality of periodic structures on the hard alloy layer through the etching by the picosecond green laser, wherein a spacing between the third periodic structures is an integer multiple of a wavelength of a stress wave applied onto the corresponding surface of the flow passage component; and step S4: laser cladding a ceramic alloy layer on a surface of the hard alloy layer by coaxial powder feeding using the semiconductor laser to form a gradient damping composite coating.

2. The anti-cavitation damping composite metal structure for the flow passage component according to claim 1, wherein the step S1 comprises:

polishing the substrate made of the high-manganese aluminum bronze with 200-2,000 grit sandpaper, and forming the first periodic structures on the substrate made of the high-manganese aluminum bronze through the etching by the picosecond green laser with a power of 30 W in a three-dimensional (3D) galvanometer scanning mode at a scanning speed of 100 mm/s, wherein the first periodic structures are pyramid structures with the spacing of 2.7 mm.

3. The anti-cavitation damping composite metal structure for the flow passage component according to claim 1, wherein the step S2 comprises:

cladding the nickel copper layer on the surface of the substrate made of the high-manganese aluminum bronze by the semiconductor laser with a power of 700 W and a scanning speed of 8 mm/s, using a circular spot with a diameter of 2 mm and a defocusing amount of 11 mm through the coaxial powder feeding at a powder feeding rate of 8.5 g/min, with Ar as a protective gas, wherein the nickel copper layer is prepared from a mixed powder comprising 60 wt. % Ni, 33 wt. % Cu, and 7 wt. % Fe; and polishing the nickel copper layer, and forming the second periodic structures on the nickel copper layer through the etching by the picosecond green laser with a power of 30 W in a 3D galvanometer scanning mode at a scanning speed of 100 mm/s, wherein the second periodic structures are pyramid structures with the spacing of 2.7 mm.

4. The anti-cavitation damping composite metal structure for the flow passage component according to claim 1, wherein the step S3 comprises:

cladding the hard alloy layer on the surface of the nickel copper layer by the semiconductor laser with a power of 1,500 W and a scanning speed of 15 mm/s, using a circular spot with a diameter of 2 mm and a defocusing amount of 11 mm, at a powder feeding rate of 17 g/min, with Ar as a protective gas, wherein the hard alloy layer is prepared from a mixed powder comprising 0.03 wt. % C, 0.7 wt. % Si, 1.25 wt. % Mn, 17.6 wt. % Cr, 19.5 wt. % Ni, 2.25 wt. % Mo, and 58.67 wt. % Fe; and polishing the hard alloy layer, and forming the third periodic structures on the hard alloy layer through the etching by the picosecond green laser with a power of 30 W in a 3D galvanometer scanning mode at a scanning speed of 100 mm/s, wherein the third periodic structures are pyramid structures with the spacing of 2.7 mm.

5. The anti-cavitation damping composite metal structure for the flow passage component according to claim 1, wherein the step S4 comprises:

cladding the ceramic alloy layer on the surface of the hard alloy layer by the semiconductor laser with a power of 2,500 W and a scanning speed of 200 mm/s, using a circular spot with a diameter of 2 mm and a defocusing amount of 11 mm, through the coaxial powder feeding at a powder feeding rate of 10 g/min, with Ar as a protective gas, wherein the ceramic alloy layer is prepared from a mixed powder comprising 42 wt. % Ni, 42 wt. % Fe, 3 wt. % B, 3 wt. % Si, and 10 wt. % SiC, thereby forming a surface ceramic alloy layer.

6. The anti-cavitation damping composite metal structure for the flow passage component according to claim 1, further comprising: step S5: strengthening the ceramic alloy layer by a laser shock peening technique, refining grains in the ceramic alloy layer to form nano twins on a surface of the ceramic alloy layer, and implanting a residual compressive stress layer.

7. The anti-cavitation damping composite metal structure for the flow passage component according to claim 6, wherein the step S5 comprises: taking a black tape as an absorption layer and water as a restraint layer with a thickness of 2 mm; and using a circular Gaussian spot with a diameter of 3 mm, a spot overlapping ratio of 50%, a single pulse energy of 5-10 J, and a pulse width of 10 ns.

* * * * *